United States Patent

[11] 3,542,160

[72] Inventor Columbus R. Sacchini
   Willowick, Ohio
[21] Appl. No. 779,919
[22] Filed Nov. 29, 1968
[45] Patented Nov. 24, 1970
[73] Assignee The Marquette Metal Products Company
   Cleveland, Ohio
   a corporation of Ohio. by mesne assignment

[54] REVERSE ROTATION BRAKE MECHANISM
   4 Claims, 3 Drawing Figs.
[52] U.S. Cl. .................................................. 188/82.6,
   188/77, 188/82.84; 192/41, 192/81
[51] Int. Cl. .................................................. F16d 63/00
[50] Field of Search .................................... 188/77W,
   188/77, 188/82.84; 192/35, 415, 81, 12B1

[56] References Cited
   UNITED STATES PATENTS
1,915,885  6/1933  Gillett ........................... 192/41(S)
2,951,568  9/1960  Hungerford et al. .......... 192/41(S)X
3,442,359  5/1969  Atchison ....................... 192/41(S)

Primary Examiner—George E. A. Halvosa
Attorneys—Arthur Frederick and Victor D. Behn ABSTRACT: A brake mechanism for arresting rotation of a rotary member in a direction counter to a preselected direction of rotation comprises a shaft journaled for rotation in a fixed hub and a control sleeve supported coaxially on the shaft and the hub. A control spring is disposed to extend in bridging relationship to the shaft and hub and, in the preselected direction of rotation, connected to the shaft and sleeve to provide conjoined rotation of the sleeve and shaft. A one-way clutch means is carried by the hub and coacts with the control sleeve to permit free rotation of the sleeve in the preselected direction and arrest the sleeve rotation upon rotation thereof counter to the preselected direction of rotation. The control spring is constructed and arranged so that, upon cessation of rotation of the control sleeve, it disengages at one end portion from the sleeve and engages the hub, thereby stopping rotation of the shaft.

Patented Nov. 24, 1970

3,542,160

INVENTOR
COLUMBUS R. SACCHINI

BY Arthur Frederick

ATTORNEY 3,542,160

1

REVERSE ROTATION BRAKE MECHANISM

BACKGROUND OF THE INVENTION

This invention relates to braking mechanisms, and more particularly to a braking mechanism associated with a rotating member to cease rotation of the member in a direction opposite that of a preselected direction of rotation.

Heretofore, known braking mechanisms of the type employing a helically formed spring, as exemplified in the U.S. Pat. to Starkey et al., No. 1,843,145, were found to have relatively short operative life when used in applications, such as in drive means for ferris wheels, where the mechanism was subjected to long periods of operation without braking. This relatively short operative life was due to the "overrunning" or relative rotation of the spring to the other parts of the mechanism which resulted in the generation of heat, chatter and fretting corrosion and, in turn, rapid deterioration and wear of the spring and other parts of the mechanism.

It is therefore an object of this invention to provide a braking mechanism for a rotating member, in which mechanism excessive heat generation, chatter and fretting corrosion are minimized so that the mechanism has a relatively trouble-free and long operative life.

SUMMARY OF THE INVENTION

The invention, therefore, contemplates a novel brake mechanism for a rotating member, such as a drive shaft, comprising a drum shaped adapter secured to the rotating member for conjoined rotation with the latter and suitably journaled within a nonrotatable or fixed hub or housing. The adapter and fixed hub have coextensive annular gripping surfaces bridged by a coil spring. A rotatable control sleeve is mounted coaxially on the adapter and hub so as to overlie the coil spring. The coil spring is connected, at one end portion, to the adapter and, at the other end portion, to the control sleeve and spaced from the gripping surface of the hub. The coil spring helix is formed in the same direction as the direction of rotation of the rotating member so as to maintain the clearance with the hub during rotation of the rotating member in the preselected direction of rotation and, upon reverse rotation of the rotating member, contract and wrap around the gripping surface of the hub to thereby effect cessation of rotation of the rotating member.

To automatically effect braking, the fixed hub is provided with a one-way clutch means for restraining rotation of the control sleeve upon reverse rotation of the control sleeve. The clutch means comprises at least one cam means resiliently biased to engage the under surface of the sleeve portion supported on the fixed hub, the cam means being constructed and arranged to allow free rotation of the sleeve in the preselected direction of rotation and restrain rotation of the sleeve upon rotation thereof in the opposite direction. When reverse rotation of the sleeve occurs and such rotation is restrained by the cam means, the energizing torque applied thereby to the spring by the sleeve causes the spring to wrap down and around the gripping surface of the hub to thus stop rotation of the rotating member.

In one embodiment of this invention the spring is free floating with respect to both the adapter and the control sleeve and in preloaded or interference engagement with the adapter and control sleeve, while in another embodiment one end of the spring is interlockingly connected to the sleeve and the opposite end is free floating and in preloaded engagement with the adapter.

The invention will be more fully understood from the following detailed description thereof, when considered in connection with the accompanying drawing, wherein two embodiments of the invention are illustrated by way of example and, in which:

2

Figure 1:
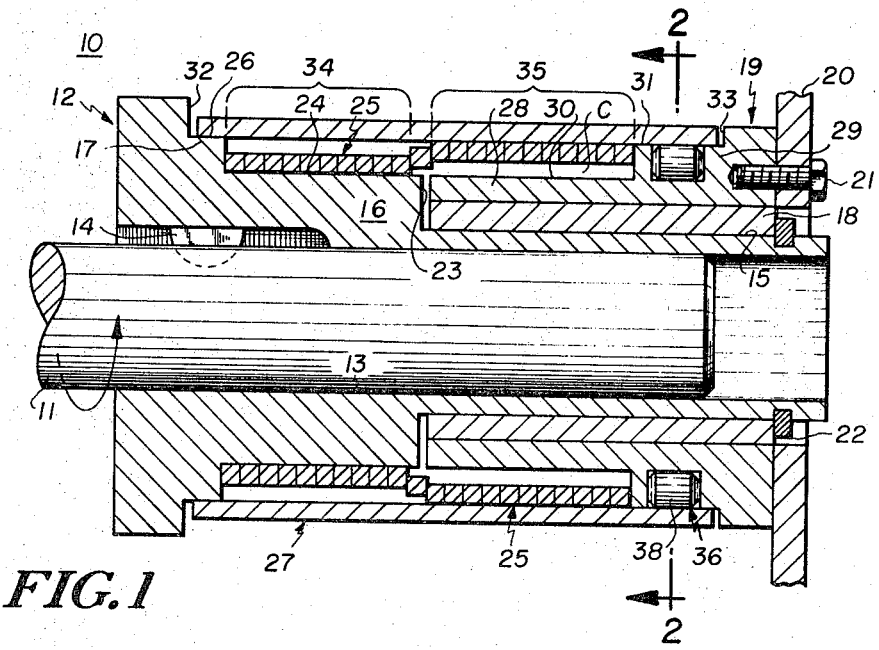
FIG. 1 is a longitudinal view, in cross section, of the brake mechanism according to this invention.
Figure 2:
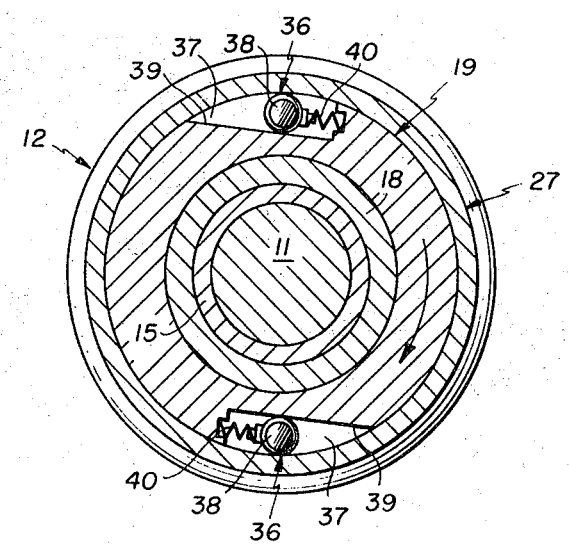
Figure 3:
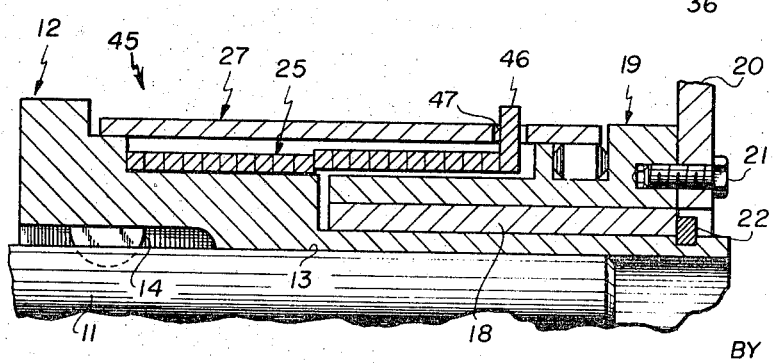

FIG. 2 is a transverse cross-sectional view taken substantially along line 2—2 of FIG. 1; and FIG. 3 is a fragmentary longitudinal view, in cross section, of another embodiment of this invention.

DESCRIPTION OF THE PREFERRED EMBODIMENT

Now referring to the drawings and more specifically to FIGS. 1 and 2, the reference number 10 generally designates the brake mechanism according to the preferred embodiment of this invention, which mechanism is cooperatively associated with a rotating member, such as a shaft 11, to allow rotation of shaft 11 in a preselected direction of rotation and stop rotation of the shaft in an opposite direction. The shaft 11 is connected for rotation to any suitable rotary drive means, now shown.

The brake mechanism 10 includes an adapter 12, having an axial bore 13, to receive therein shaft 11 and suitably secured, as by a key 14 or the like, for forms rotation with shaft 11. Adapter 12 is provided with successively reduced diameter portions, a small diameter portion 15, an intermediate diameter portion 16 and a large diameter portion 17. The small diameter portion 15 forms a journal receivable in a bearing 18 disposed in a hub 19, the hub being supported against rotation by connection to a stationary wall or frame 20 by bolts 21 (only one of which is shown in FIG. 1), or by any other suitable mounting means. The adapter is axially secured in bearing 18 between a retaining ring 22 and the annular shoulder 23 which is formed between the small diameter portion 15 and the intermediate diameter portion 16 of the adapter. The intermediate diameter portion 16 of adapter 12 provides an annular gripping surface 24 which is embraced by one portion of a control spring 25. The large diameter portion 17 forms an annular bearing surface 26 which is dimensioned to rotatively support the left-hand end portion, as viewed in FIG. 1, of a control sleeve 27.

The hub 19 has two successively reduced diameter portions 28 and 29. The reduced diameter portion 28 is dimensioned to form an annular gripping surface 30 which is coextensive with the annular gripping surface 24 of adapter 12. The reduced diameter portion 29 is dimensioned to form an annular bearing surface 31 which is coextensive with the annular bearing surface 26 of adapter 12 and functions to support the right-end portion of control sleeve 27, as viewed in FIG. 1. The control sleeve 27 which is supported coaxially relative to adapter 12 and hub 19, is limited in axial movement by the annular shoulders 32 and 33 formed in adapter 12 and hub 19, respectively.

The control spring 25 is a helically formed spring which is preferably of conventional "flat-wound" construction and wound in the same direction as the preselected direction of rotation of shaft 11. A group of coils 34 of control spring 25 is disposed in preloaded "anchoring" relationship to gripping surface 24 of adapter 12 while another portion 35 of control spring 25 is in free floating, interference or preloaded relationship to the adjacent inner surface of control sleeve 27 and spaced from gripping surface 30 of hub 19 to define therebetween an annular clearance C. In the preselected direction of rotation of shaft 11, which can be assumed to be in the direction of the arrow shown in FIG. 1, the preloading of spring portions 34 and 35 is of such magnitude that rotation of adapter 12 is transmitted, through spring 25, to control sleeve 27, and therefore shaft 11, spring 25 and sleeve 27 rotate in unison. Upon reverse rotation of shaft 11 and adapter 12 and cessation of the rotation of control sleeve 27, as hereinafter more fully explained, the frictional torque drag acting on the spring portion 35 will cause the spring to contract or wrap down upon gripping surface 30 of hub 19, thereby locking the shaft, through adapter 12 and spring 25, to hub 19.

For automatically arresting rotation of sleeve 27 upon rotation of shaft 11 opposite to the preselected direction of rotation, a one-way clutch means 36 is supported by hub 19. As best shown in FIG. 2, clutch means 36 comprises one or a plurality of circumferentially spaced, camming recesses 37 in each of which is disposed a wedge means 38 which may be either a roller, as shown in the drawings, or a spherical member without departing from the scope and spirit of the invention. Each recess 37 has a camming surface 39 which slopes inwardly from the surface of reduced diameter portion 31 of hub 19 in the direction of the preselected direction of rotation. Each roller 38 is biased by a spring 40, in a direction outwardly of the recess, into engagement with the surface of control sleeve 27 adjacent reduced diameter portion 31 of hub 19. When the rotation of sleeve 27 is in the preselected direction, as shown by the arrows in FIGS. 1 and 2, frictional engagement of the sleeve on rollers 38 tends to force the rollers downwardly in the recesses against the tension of spring 40 and away from sleeve 27. Upon rotation of sleeve 27 in a direction opposite to the preselected direction of rotation, the frictional drag of sleeve 27 on rollers 38 and the force of springs 40 wedges the rollers between the camming surface 39 of the recess and the sleeve 27, thus locking the sleeve against rotation.

In operation of the brake mechanism 10, herein described, assuming a preselected direction of rotation to be clockwise as indicated in the drawings, shaft 11, adapter 12, control spring 25 and control sleeve 27 rotate in unison. During this phase of operation, the points of relative rotation are between journal 15 and bearing 18 and between the small portion of control sleeve 27 adjacent reduced diameter portion 31 of hub 19. Since there is no sustained overrunning drag between the control spring and the other components of brake mechanism 10, such as hub 19 or sleeve 27, the generation of heat, chattering corrosion and wear of the brake mechanism, in general, is negligible.

When shaft 11 turns in the opposite or in counterclockwise direction, the rollers 38 of the one-way clutch means, as heretofore described, are wedged between their associated recess 37 and control sleeve 27 thereby locking the control sleeve to hub 19. With control sleeve 27 locked against rotation, the frictional drag torque imposed on spring portion 35 of spring 27 in an opposite direction will cause spring portion 35 to wrap down upon gripping surface 30 of hub 19, thereby locking adapter 12 and shaft 11 to the fixed hub 19, and stopping rotation. After rotation is stopped, and shaft 11, adapter 12 and sleeve 27 are no longer urged to rotate in the direction opposite to the preselected direction, spring 25 releases from hub 19 and reengages sleeve 27 so that rotation in a clockwise direction can be resumed.

In FIG. 3 is shown a fragmentary view of an alternative embodiment of this invention which only differs from the embodiment of FIGS. 1 and 2, in that the one end of the control spring is structurally connected to the control sleeve rather than being connected frictionally through a preloading of the spring. Also, while not shown, the spring may be structurally connected to the adapter as well as to the sleeve. In FIG. 3, the parts of the brake mechanism 45 corresponding to like parts of brake mechanism 10 will be identified by the same reference numbers.

DESCRIPTION OF THE ALTERNATIVE EMBODIMENT

As shown in FIG. 3, spring 25 is not "stepped" as in brake mechanism 10 and is connected to control sleeve 27 by an offset end portion or toe 46 extending into an aperture 47 in control sleeve 27. When rotation of shaft 11 is in the preselected direction, conjoined rotation of control sleeve 27 with the shaft and adapter 12 is achieved by reason of the interlocking relationship of toe 46 of spring 25 and aperture 47 of the control sleeve.

The operation of brake mechanism 45 is the same as that described for brake mechanism 10 wherein shaft 11 and adapter 12 are locked against rotation to hub 19 when, upon rotation counter to the preselected direction of rotation of shaft 11, sleeve 27 is held against rotation by one-way clutch means 37 and spring portion 35 of control spring is thereby caused to wrap down upon gripping surface 30 of hub 19.

It is believed now readily apparent that a novel rotary brake mechanism has been disclosed which is capable of long, sustained operation with minimal heat generation, wear or chatter corrosion. It is a relatively simple mechanism capable of long, trouble-free operation.

Although two embodiments of the invention have been illustrated and described in detail, it is to be expressly understood that the invention is not limited thereto. Various changes can be made in the arrangement of parts without departing from the scope and spirit of the invention as the same will now be understood by those skilled in the art; as for example, adapter 12 may be made integral with shaft 11.

I claim:

1. A brake mechanism for stopping rotation of a rotating member in a direction counter to a preselected direction of rotation comprising:
   a. a hub fixedly supported in coaxial relationship to the rotating member;
   b. a control sleeve supported at its opposite end portions concentrically on said rotating member and hub for rotation relative to the rotating member and hub;
   c. a control spring having helical coils concentrically disposed with respect to the hub and rotating member and secured to the rotating member and the sleeve to effect conjoined rotation of the rotating member and the sleeve in the preselected direction of rotation;
   d. one-way clutch means having at least one camming recess in the hub and a wedge means in the recess biased in a direction to engage the control sleeve, the camming recess and wedge means coacting to permit the wedge means to tend to move away from the control sleeve during rotation of the sleeve in the preselected direction of rotation and to force the wedge means between the camming recess and sleeve upon rotation of the sleeve in a direction opposite from the preselected direction of rotation and thereby arrest rotation of the sleeve; and
   e. said control spring being so wound in relation to the preselected direction of rotation that upon cessation of rotation of the sleeve and rotation counter to the preselected direction of rotation of the rotating member the control spring wraps down to grip the hub and thereby arrest rotation of the rotating member.

2. The apparatus of claim 1 wherein said one-way clutch means includes a plurality of circumferentially spaced recesses in the peripheral surface of the hub adjacent the portion of the sleeve supported by the hub, and a wedge means in each of said recesses biased in a direction to engage the control sleeve, each camming recess and its associated wedging means coacting to permit the wedge means to tend to move away from the control sleeve during rotation of the sleeve in the preselected direction of rotation and to force the wedge means between the camming recess and sleeve upon rotation of the sleeve in a direction opposite from the preselected direction of rotation and thereby arrest rotation of the sleeve.

3. A brake mechanism for stopping rotation of a shaft about its longitudinal axis in a direction of rotation counter to a preselected direction of rotation, the mechanism comprising:
   a. a hub supported against rotation;
   b. an adapter secured for conjoined rotation to the shaft;
   c. the adapter journaled for rotation in the hub;
   d. the adapter and the hub having coextensive peripheral gripping surfaces;
   e. a control sleeve concentrically supported at opposite end portions by the adapter and the hub in spaced relation to the peripheral gripping surfaces;
   f. a helical spring disposed to extend in concentric relation to the gripping surfaces of the adapter and hub in the space between the gripping surfaces and the control sleeve;
   g. the helical spring having one end portion in preloaded relation with the gripping surface of the adapter to grasp the latter and connected at the opposite end portion to the sleeve to thereby effect conjoined rotation of the shaft, adapter and sleeve in the preselected direction of rotation;

h. a one-way clutch comprising a plurality of circumferentially spaced recesses in the peripheral surface of the hub adjacent the portion of the sleeve supported by the hub, and a wedge means in each of said recesses biased in a direction to engage the control sleeve, each camming recess and its associated wedge means coacting to permit the wedge means to tend to move out of contact with the sleeve during the rotation of the sleeve in the preselected direction of rotation and to force the wedge means between the camming recess and sleeve upon rotation in a direction opposite the preselected direction of rotation and thereby arrest rotation of the sleeve; and i. said helical spring being so formed in relation to the preselected direction of rotation that, upon cessation of rotation of the sleeve and rotation counter to the preselected direction of the shaft, the control spring disengages from the sleeve and wraps around the gripping surface of the hub to thereby arrest rotation of the shaft.

4. The apparatus of claim 3 wherein the wedge means is a roller.